April 11, 1961   F. KERN, JR., ET AL   2,979,067
PRESSURE REGULATOR
Filed Sept. 21, 1953   3 Sheets-Sheet 2
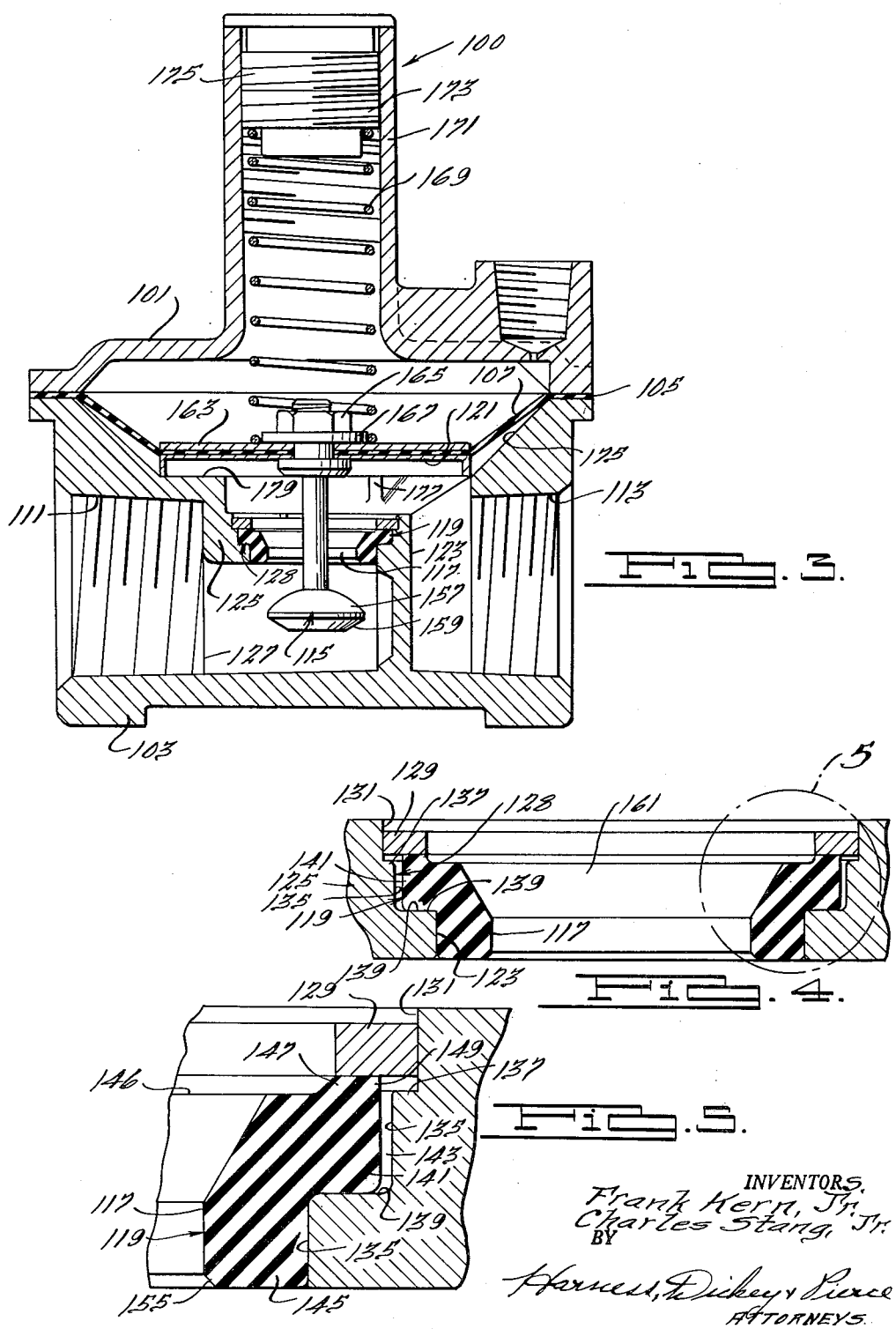
INVENTORS.
Frank Kern, Jr.
Charles Stang, Jr.
BY
Harness, Dickey & Pierce
ATTORNEYS.

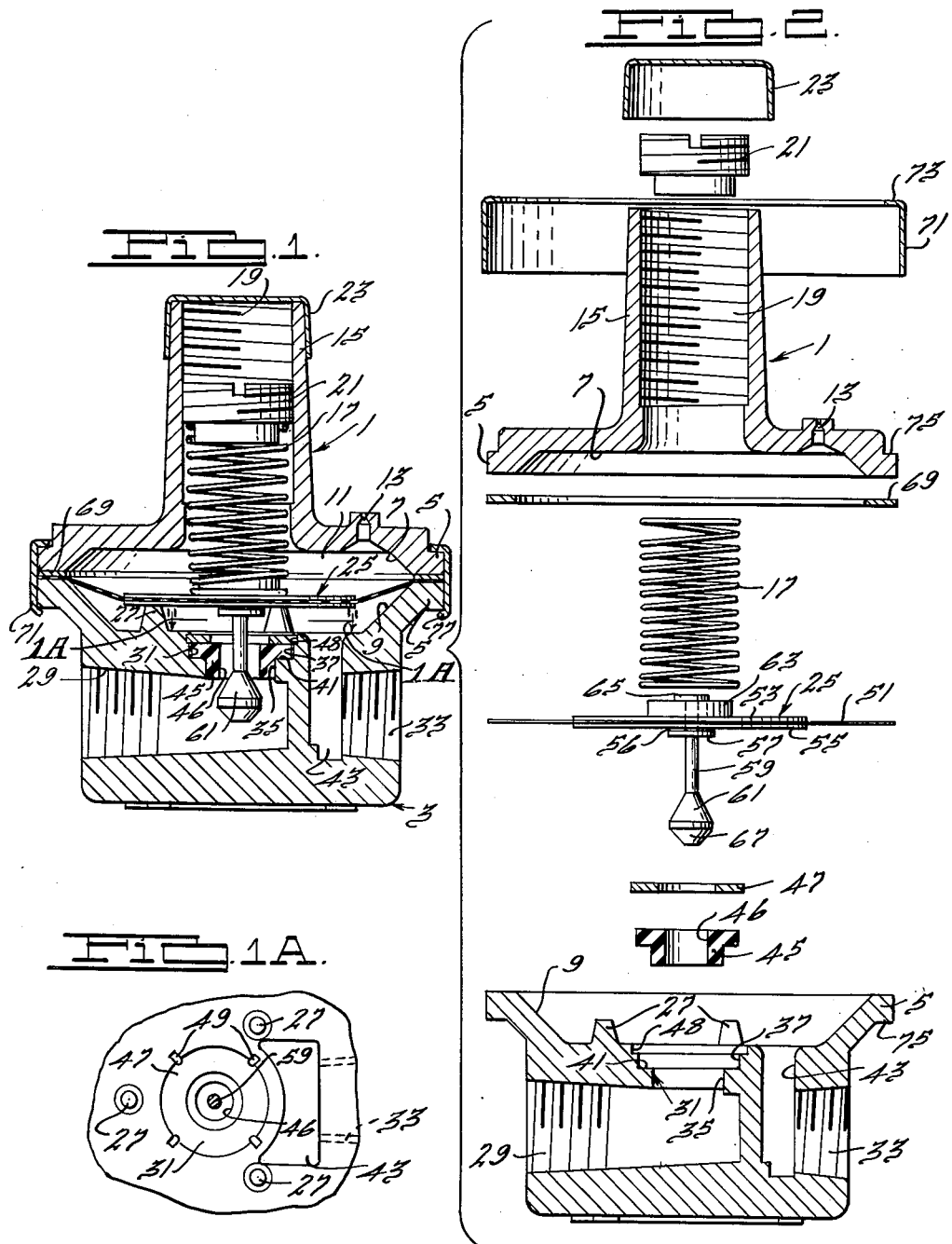

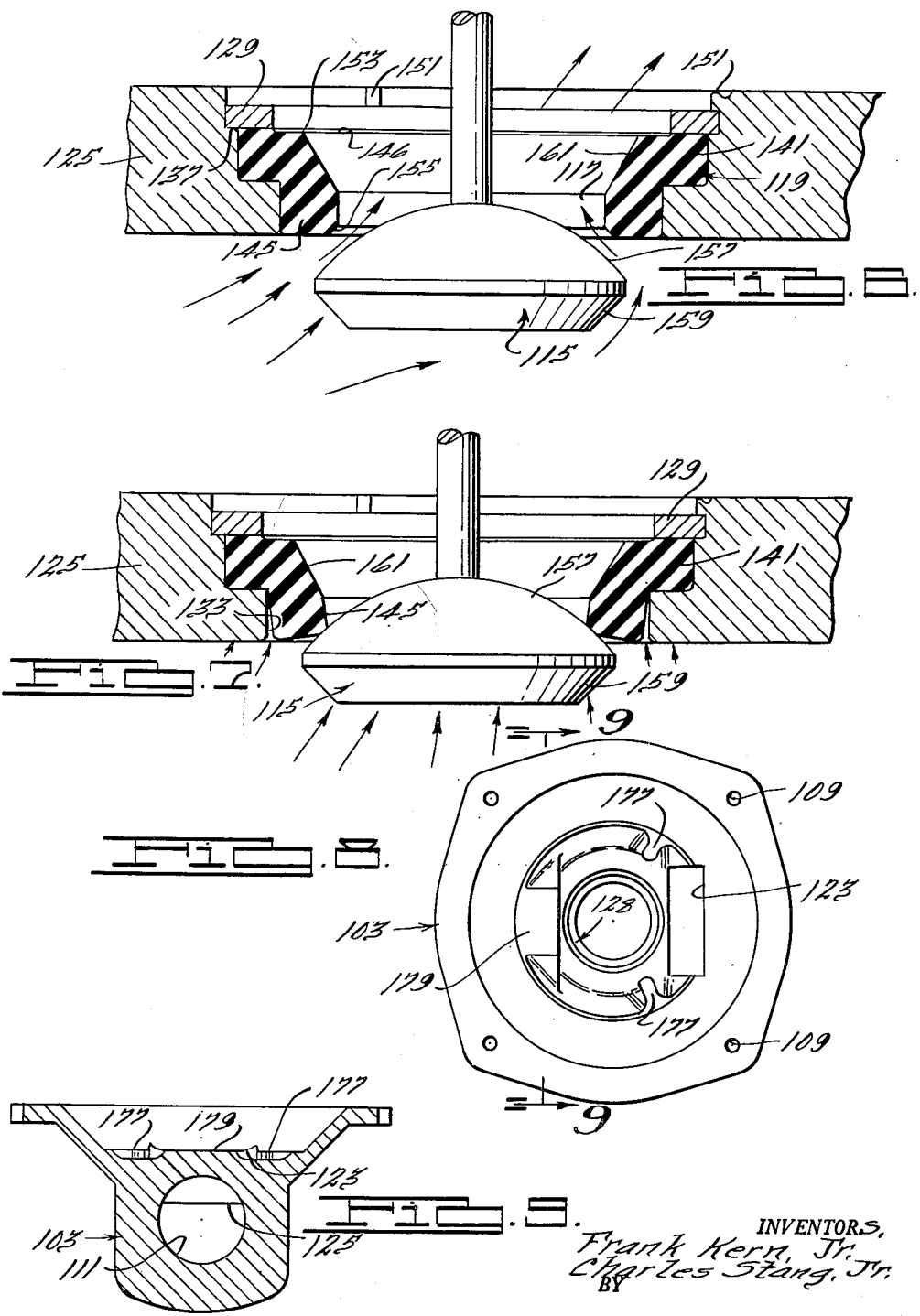

United States Patent Office 2,979,067
Patented Apr. 11, 1961

2,979,067

PRESSURE REGULATOR

Frank Kern, Jr., Detroit, and Charles Stang, Jr., St. Clair Shores, Mich., assignors to Maxitrol Company, Detroit, Mich., a corporation of Michigan Filed Sept. 21, 1953, Ser. No. 381,298

16 Claims. (Cl. 137—15)

This application is a continuation-in-part of our prior copending application, Serial No. 341,768, filed March 11, 1953, now abandoned.

Our invention relates to pressure regulators and, in particular, refers to regulators adapted to control flow of gas.

Our primary object in developing the regulator design forming the subject matter of this invention has been to materially reduce the cost of manufacture of a regulator which would provide adequate capacity and satisfactory performance. In analyzing the existing regulators that have met with commercial and AGA acceptance, we have noted three features, in particular, which maintain their cost at a relatively high level. The first of these features common to most existing regulators is the necessity of assembling the valve and the diaphragm mechanism after they are in place at final assembly of the regulator. This operation is relatively complicated and difficult, and thus expensive, when done at final assembly because of interference by other parts.

A second feature which adds to the expense of present regulators is the necessity of machining the valve seat, a feature which often calls for a bottom access plug to be added to the regulator body. The bottom opening is often needed, too, for the valve assembly noted above. Obviously, this machining operation adds a significant item of cost to the total expense of manufacture.

A third feature which increases the cost of producing existing regulators is the use of screws to interconnect the top and bottom halves of the regulator together. This feature, of course, necessitates machining operations in forming the threaded holes which receive the screws and requires a relatively lengthy assembly operation to put the screws in place.

In the regulator embodying the principles of our invention, we have eliminated these three features which tend to increase the cost of manufacture. In eliminating the first feature, assembly of the valve and diaphragm at final assembly, we use a rubber grommet type valve seat through which the valve can be pushed from the top side of the seat at final assembly. This makes it possible to preassemble the valve and diaphragm assembly. The use of the rubber valve seat eliminates the second objectionable feature inasmuch as it removes the necessity for a bottom access plug in the regulator body to enable machining of a valve seating surface. Our rubber seat is designed to give a good seating surface during operation and so that it can not at high pressures permit the valve to blow out. In order to remove the third objectionable feature of present regulators, namely the use of screws to assemble the top and bottom halves, we have developed a clamping ring which can be deformed into place to secure the regulator parts together. This has the further advantage of making the regulator tamper-proof since it prevents separation of the top and bottom halves of the regulator body.

Our improved regulator design is of great value in the gas pilot regulator field where it has, in actual use, given adequate capacity and satisfactory performance while at the same time eliminating approximately 30% of the machining and assembly operations. The design is also important in the gas appliance regulator field where it furnishes excellent performance at lower cost.

By way of illustration, an embodiment of our invention is shown in the accompanying drawings in which:

Figure 1 is a vertical section taken through a pilot gas regulator embodying the invention;

Fig. 1A is a section along line 1a—1a of Fig. 1;

Fig. 2 is an exploded view illustrating a manner in which the regulator can be assembled;

Fig. 3 is an enlarged cross section through another form of gas regulator embodying the invention, this regulator being of the type that can be used on household appliances such as clothes driers, garbage and trash burners, etc.;

Fig. 4 is an enlarged view of the seat portion of the regulator shown in Figure 3, showing the condition of the rubber and washer prior to staking of the washer in place;

Fig. 5 is an enlarged view of the structure shown within the circle 5 of Figure 4;

Figure 6 is an enlarged view of the seat showing the washer in staked position and the valve in a normal operating position;

Fig. 7 is a section of the seat showing the action of the rubber and the valve under a condition of abnormally high pressure;

Fig. 8 is a reduced size plan view looking down on the bottom half section of the regulator housing shown in Figure 3, this view being full scale for a ½ or ¾ inch regulator; and Fig. 9 is a cross section taken along the line 9—9 of Figure 8.

The improved regulator shown in Figures 1-2 has a housing or body consisting of top and bottom halves 1 and 3, respectively. Both top and bottom sections are circular and each is provided with confronting peripheral flanges 5 which are secured together by screws in the conventional manner or by the novel clamping ring described hereinafter to complete the regulator housing. Opening out of the confronting faces of the sections 1 and 3 are inwardly relieved portions or recesses 7 and 9, respectively, which cooperate to define a diaphragm chamber 11. Opening out of the top of the chamber 11 is a vent orifice 13. Extending upwardly from the chamber 11 in the top section 1 is a hollow tubular portion 15 which houses the spring 17. The interior 19 of the section 15 is threaded to receive an adjustment plug 21 that bears upon the top end of the spring 17. A stamped sheet metal cap 23 fits over the top of the tubular section 15 and is held in place by a pressure fit with the outside thereof.

The bottom of the spring 17 bears upon the diaphragm and valve mechanism 25, and when no gas is flowing through the regulator, forces the assembly against upstanding frusto-conical stops 27 that project upwardly from the bottom of the recess 9 in the lower housing section 3. The lower half 3 has an inlet passage 29 formed therein which is threaded to receive an inlet pipe (not shown) and diametrically opposite the inlet 29 it is provided with a tapped outlet passage 33 for an outlet pipe (not shown). The inlet passage 29 is connected to the bottom of the valve chamber 11, i.e., into the recess 9, through a valve seat receiving aperture 31 which includes a lower portion 35 and an enlarged intermediate portion 37, the two portions having the radial shoulder 41 between them. The outlet passage 33 is connected into the lower half of the chamber 11 by means of the passage 43 that is formed in the housing section 3.

It will be seen that the top and bottom sections 1 and 3 can be die cast and that only four machining operations are required to prepare them for final assembly: (1) Holes 29 and 33 are threaded in one operation. (2) The diameters of hole 31 are qualified in one operation. (3) Hole 19 is threaded. (4) Orifice 13 is drilled as flash may remain from die casting. The remaining structural features can be formed in the die casting operations.

The shoulder 41 serves as a seat for a rubber valve seat grommet 45. The seat 45 is in the shape of a flange bushing and extends into the aperture section 35 and its flange fits in the aperture section 37. A metal retainer ring 47 fits in an enlarged top portion 48 of the valve seat aperture 31 and is staked in place as shown at 49 and is pressed against the flange of grommet 45, thus holding the seat firmly in place. This operation is done as a subassembly.

The valve and diaphragm mechanism 25 is also put together as a subassembly. This includes the flexible diaphragm 51 that carries top and bottom diaphragm pressure plates 53 and 55 respectively. The bottom diaphragm pressure plate 55 rests via washer 56 on a radial shoulder 57 on stem 59 of the valve 61. The valve stem 59 extends upwardly from the shoulder 57 through the diaphragm and diaphragm plates and through a spring retainer 63. The top end of the valve stem 59 is spun over at 65 on the washer to securely clamp it and the other parts against the shoulder 57. In larger size regulators where it is required that they be capable of disassembly a screw and nut can be used instead of spun over shoulder 65. These operations can, of course, as already mentioned, be performed prior to final assembly.

At the final assembly the valve 61 is forced by the application of axial pressure through the bore 46 of the valve seat 45 which has already been staked in place in aperture 31. The lower end of the valve 61 is tapered as shown at 67 to facilitate its passage through the valve seat which, of course, requires expansion of the valve seat bore 46. After this has been done, the outer periphery of the diaphragm 51 will rest on the top surface of flange 5. A gasket 69 is placed over it and the flange 5 of the top section 1 is placed against the gasket so that the peripheral edge of the diaphragm is held between the top and bottom sections 1 and 3. The two sections are clamped together by means of a steel clamping ring 71 that has an inwardly projecting radial shoulder 73 which seats on a radial shoulder 75 on the top section 1. At assembly the bottom end of the ring 71 is turned inwardly underneath the shoulder 75 on the bottom section 3 as shown at 77 thus firmly and permanently clamping the top and bottom housing sections together and securing the diaphragm in place.

After the above assembly operations have been completed, the spring 17 can be placed in the bore 19, and the plug 21 threaded in place to exert the desired pressure on the diaphragm 51. It will be seen that the washer 63 serves to properly locate the bottom end of the spring 17. As a final assembly operation the cap 23 is pressed in place.

The operation of this regulator is similar to that of existing regulators and need not be explained in detail, it being obvious that the gas enters the inlet 29, passes by the valve 61 upwardly through the aperture 46, and then through the stops 27 and downwardly through passage 43 out of the passage 33. The resultant of the gas pressure on the bottom of the diaphragm and the spring force on the top determines the location of the valve 61 and thus the size of the orifice through which the gas must pass in order to enter aperture 46. This, of course, furnishes the pressure regulation.

In the regulator 100 of Figures 3–9 there is a housing consisting of the top half 101 and the bottom half 103 which are secured together, with the edge 105 of the diaphragm 107 between them, by screws (not shown) extending through holes in the top half 101 and threading into holes 109 in the bottom half. Gas enters the bottom half through the pipe threaded inlet passage 111 and leaves the bottom half through the pipe threaded outlet section 113. Gas flowing from inlet passage 111 to outlet passage 113 follows a conventional path. It flows by the valve 115 upwardly through the valve controlled passage 117, which is the inner diameter of the rubber valve seat 119, where it exerts pressure on the diaphragm 107 and the bottom diaphragm clamp plate 121 and then flows into aperture 123 which empties into outlet passage 113. Since each restriction in the path of the gas flow causes a pressure drop it is proposed in the regulator 100 to substantially equalize the various points of pressure drop in the gas passage. This is done by making the various restricted openings of more nearly the same area. Thus the body seat portion 125 is lowered into the inlet passage 111 as compared with the regulator shown in Figure 1 with the result that the area along the plane 127 more nearly approaches the minimum cross sectional area of passage 117 and the area of passage 123 which are the other two points of restriction. By dropping the seat 125 the over-all height of the regulator is reduced somewhat and less metal is required to make the bottom half 103.

The body seat portion 125 has an aperture 128 in it which receives the rubber valve seat 119 and the washer 129 that is used to hold the rubber seat in place. The aperture 128 is of stepped shape and has a large diameter 131 at the top and a small diameter 133 at the bottom and an intermediate diameter 135 between the top and bottotm diameters. This change in diameters provides an upwardly facing shoulder or seat 137 for the washer 129 and a second upwardly facing seat 139 that engages the bottom of the flange 141 on the rubber seat 119, the corner of seat 139 and diameter 135 having a radius as shown which improves the seal obtained between the seat 119 and body.

The rubber flange 141 has an outer diameter which is somewhat less than the diameter 135 so that a clearance 143 exists between the two diameters prior to final assembly of the rubber in the seat 125, such a clearance also being shown in the embodiment of Figure 1. The lower and smaller diameter portion of the rubber seat 119 has an outer diameter which snugly fits the diameter 133. Thus, when the rubber seat 119 is put in position, the snug fit of section 145 with the diameter 133 will coaxially align the rubber seat and the aperture 128. However, the section 145 is not radially compressed when it is inserted in the diameter 133. The flange 141 of the rubber body 119 is cored out or counterbored on top down to the annular surface 146 which is located slightly below the plane of the shoulder 137 when the flange is seating on the shoulder 139. In other words, there is a slight clearance between the washer seating surface 137 and the rubber surface 146. Projecting upwardly from the surface 146 is a lip or ring 147 which is squared off at the top outside corner 149 of the rubber body 119. The lip 147 projects a slight distance above the surface 137 and the volume so projecting is no greater than the volume contained within the clearance 143 and preferably of approximately the same volume. The washer 129 rests on the lip 147 and this squares it up with the axis of the aperture 128. When it is depressed against the resistance of the rubber onto seat 137 and staked in place as shown at 151, it will compress the lip 147 and the rubber thus compressed seems to flow into the clearance 143 so as to more or less completely fill it up as shown in Figure 6. This supplements the seal between the bottom of flange 141 and shoulder 137 and results in a leakproof inserted seat. Due to the clearance 153 between the surface 146 and the flange 137 and also due to the clearance 143, pressure of the washer 129 when it is staked in place acts to press the flange 141 against seat 139 and to deform the lip 147 resulting in a perfect seal along the surface 139 and the diameter 135. Distortion of the rubber is confined to the lip 147 and possibly to some radial expansion of flange 141. This is an important feature. Since distortion does not reach rubber section 145 the rubber body does not go out of round which would make it impossible to have a perfect seal between the valve 115 and its seat when the valve is in closed position.

In addition to this anti-distortion feature, an important advantage of the rubber valve seats shown herein lies in their reaction to high pressures within the regulator. As best illustrated in Figure 7, a high pressure condition will drive the valve 115 up against the rubber seat 119 and if the pressure is great enough there is a tendency to force the valve right up through the aperture 117 of the seat 119. Of course, if this happened, it would result in disassembly and make the regulator inoperative. This, however, cannot occur with the present valve seats since, as shown in Figure 7, high pressure will get between the diameter 133 and the outer diameter of the valve portion 145 and force the section 145 inwardly to reduce its diameter. This inward distortion increases with the pressure and since it closes the opening 117 through which the valve 115 must pass, it effectively prevents the valve from ever blowing out.

In order to insure a perfect closed valve seal even though the valve 115 may not be exactly coaxial with the aperture 117 the bottom face of the rubber seat 119 is countersunk at 155 along a straight line, i.e., it is a conical section. The valve 115 has a seating surface 157 that engages the seat 155 and the surface 157 is curved on a constant radius, i.e., a section of a sphere. Thus there is a circular line contact at the various points of tangency between the surface 157 and the surface 155 and this is obtained even though the valve 115 is slightly cocked or at an angle to the axis of the valve seat 119. Better action of the valve is obtained by having a line contact instead of a surface-to-surface contact such as would be obtained if surface 157 were straight instead of curved.

The bottom of the valve 115 has a surface 159 which is a conical segment, the cone preferably lying on radii of the surface 157 as shown in the drawings. The valve 115 is, of course, assembled in the same manner as the valve 61 in the embodiment of Figures 1 and 2, i.e., by pushing it through the aperture 117 which is of somewhat smaller diameter than the maximum diameter of the valve. In order to facilitate this operation and expansion of the seat 119 without destroying its seal to the body portion 125 by virtue of the staked washer 129, the rubber seat 119 is provided with a tapered funnel section 161 which may be located on the angle illustrated on the drawings, i.e., somewhat less inclination to the vertical than the surface 159. Thus, when the valve 115 is pushed down through the rubber seat 119, the section 161 will act somewhat like a funnel to ease the passage of the valve through the aperture 117 and the taper section 159 will, of course, also facilitate insertion of the valve. Since surface 159 is not on the same angle as funnel 161 there will be only line contact between them and gripping of the rubber will be minimized. One of the two surfaces could be straight and the other curved in order to achieve this desired line contact rather than surface contact. The maximum diameter of valve 115 is preferably less than the largest diameter of the funnel and yet sufficiently large so that the seat 155 will always contact a portion of surface 157. We have found that when diameter 117 is ½" good results are obtained if the valve 115 is about .015" larger. Our antiblowout feature makes it possible to have the valve only slightly larger than the rubber seat whereby insertion of the valve is made relatively easy.

In the regulator 100 the upper diaphragm plate 163 and the lower flange diaphragm plate 121 are clamped together against the diaphragm 107 by means of the nut 165 that threads on the end of the valve 115 and bears on washer 167. The spring 169 fits around the washer 167 and extends up into the stack 171 and has its pressure regulated by the adjustment screw 173 that threads on the inside of the stack. The plug 175 replaces cap 23 and threads into the top of the stack and shoulders against the top edge thereof to close the stack opening.

Assembly of the valve 100 is accomplished by the same method that has been outlined in connection with the regulator of Figures 1 and 2. When the top half 101 is screwed into the bottom half 103 after the valve 115 has been forced thourgh the rubber seat 119, the diaphragm 107 is within the diaphragm cavity and in order to insure that proper axial alignment of the top and bottom sections is obtained a locating tool is positioned in the stack 171 and fits around the nut 165 to hold the diaphragm and valve concentric with the seat 117 and aperture 128 so that the diaphragm and the holes therethrough are properly aligned with the holes 109 in the flanges on the top and bottom sections 101 and 103. This results in some downward force on the diaphragm which would tend to draw it inwardly and downwardly and lower the valve 115. In order to obtain the proper height of the valve 115 and position of the diaphragm during this assembly operation, lugs corresponding to projections 27 in Figures 1–2 are formed within the lower section diaphragm cavity 175 which engage the bottom edge of the flange diaphragm plate 121. Thus the two lugs 177 may be cast in the bottom 103 for this purpose along with a flat 179 that is cast on the top of the plane 127, the surfaces of the lugs 177 and 179 being located on the same flat level. These surfaces along with the cast diameters 131, 133 and 135 and the shoulders 137 and 139 are qualified with a single tool in a single operation in the manufacture of the regulator thus insuring the proper relationship among these surfaces regardless of dimension variations in the cast form of the section 103. The lugs and surface 179 are located at the correct height to support the diaphragm and valve subassembly in just the proper position to permit the top and bottom halves to be clamped together and against the periphery of the diaphragm. No extra tools are needed to hold the valve subassembly at the desired height during assembly thereof in the housing.

The constructions shown herein are illustrative of preferred embodiments but changes therein are within the spirit and scope of the invention.

What is claimed is:

1. In a gas pilot and appliance type regulator the combination of a body having a bottom section and a top section secured to the bottom section, recesses formed in the confronting faces of said top and bottom sections and cooperating to provide a diaphragm cavity, said bottom section having a bottom wall and a valve seat receiving aperture formed in the bottom section above said wall and opening into said cavity and having a shoulder facing said top section, an inlet aperture formed in said bottom section and opening into said aperture, an outlet passage in said bottom section connected with said cavity so that gas will flow under a diaphragm in the cavity between said seat and outlet passage, a rubber valve seat member mounted in said valve seating aperture and having a flange seated on said shoulder, means secured to said bottom section and holding said rubber member seated on said shoulder, said member having a through opening connecting said inlet with said cavity, the bottom wall of said bottom section below said aperture being integral with and nonremovable from the section so that there is no access to the bottom of said seat member except through said opening and said inlet aperture, and a diaphragm and valve assembly mounted in said cavity including a valve body member of greater diameter than said opening located on the side of said valve seat member remote from said cavity, said valve seat member being deformable to permit passage of the valve body therethrough, one of said members being tapered to facilitate passage of the valve body member through the opening.

2. The invention set forth in claim 1 wherein said opening is funnel shaped at the top thereof to provide the taper for facilitating passage of the valve body member.

3. The invention set forth in claim 2 wherein said valve seat member is substantially no larger in diameter than said aperture and said flange has a lip formed on the top and outermost corner thereof which in relaxed state of the rubber projects substantially above said shoulder, and said means comprising a washer fixed to said bottom section and seated on said radial shoulder and compressing said lip against the wall of the aperture.

4. In a gas regulator the combination of a body having a bottom section and a top section secured to the bottom section, recesses formed in the confronting faces of said top and bottom sections and cooperating to provide a diaphragm cavity, a valve seat receiving aperture formed in the bottom section and opening into said cavity, an inlet aperture formed in said bottom section and opening into said aperture, a rubber valve seat mounted in said aperture and having a through opening connecting said inlet with said cavity, and a diaphragm and valve assembly mounted in said cavity including a valve body of greater diameter than said opening located on the side of said valve seat remote from said cavity, said valve seat being deformable to permit passage of the valve body therethrough, said valve seat receiving aperture having a first and smaller diameter portion opening into said inlet aperture and a second and larger diameter portion adjacent the first and providing a radial shoulder having said second diameter, said valve seat having a tubular body portion of no greater diameter than said first diameter fitting in said first diameter portion and having a radial flange of less diameter than said second diameter, said radial flange having an annular lip portion projecting from the top thereof, and means engaging said lip portion and forcing said flange against said radial shoulder with sufficient pressure to substantially reduce the thickness of the lip portion.

5. The invention set forth in claim 4 wherein said valve seat receiving aperture has a third and largest diameter portion adjacent the second diameter portion and providing a second radial shoulder having said third diameter, said second radial shoulder being located intermediate the top and bottom of said lip portion when said radial flange is seated on said first shoulder, said means comprising a washer fitting said third diameter and held against said second shoulder.

6. The invention set forth in claim 5 wherein said lip forms a square corner at the top and largest diameter of said flange.

7. The invention set forth in claim 2 wherein the bottom of said valve member is tapered on a different angle than said funnel.

8. In a gas regulator or the like, a body section having an inlet passage and an outlet passage, means communicating the two passages including a valve seat receiving aperture having a first smaller diameter extending into the inlet passage and a second larger diameter and a radial shoulder joining said diameters, a deformable rubber valve seat with a through opening having a radial flange seated on said shoulder and a portion fitting but not compressed against said first diameter, said radial flange being in relaxed condition of the rubber seat of a smaller diameter than said second diameter to provide an annular clearance before compression around the periphery of the flange, means axially compressing said flange against said shoulder, and a valve member of slightly larger diameter than said seat opening projected therethrough and disposed to engage the bottom of said seat portion opposite to said flange, said valve member having a stem extending up through said seat, and pressure responsive means connected to said stem and controlling the position of said valve member relative to said seat.

9. The invention set forth in claim 8 including a lip on top of said flange and engaged by said means and having a volume substantially no greater than the volume of said annular clearance.

10. In a gas low pressure pilot and appliance type regulator for maintaining constant outlet pressure the combination of a body having a bottom section and a top section secured to the bottom section, recesses formed in the confronting faces of said top and bottom sections and cooperating to provide a diaphragm cavity, a valve seat receiving aperture formed in the bottom section and opening into said cavity and having a shoulder facing said top section, an inlet aperture formed in said bottom section and opening into said aperture, a rubber valve seat mounted on said shoulder in said aperture and having a through opening connecting said inlet with said cavity, said valve seat having a bottom face facing away from said shoulder and forming a valve seating surface, means holding said valve seat in said bottom section in such a way that said valve seating surface is substantially unstressed, and a diaphragm and valve assembly mounted in said cavity including a valve body of greater diameter than said opening located to seat against said valve seating surface.

11. The method of manufacturing a gas pilot and appliance type regulator for maintaining constant outlet pressure beginning with top and bottom sections of the housing which have formed therein the diaphragm cavity, the valve seat, the spring retainer chamber, and the inlet and outlet conduit connections with said cavity, comprising the steps of threading the spring chamber, threading the inlet and outlet conduit apertures, inserting a rubber valve seat in the valve seat aperture, staking a washer against said rubber valve seat on the diaphragm cavity side thereof to hold it in place, assembling the valve, the diaphragm clamping plates, and the diaphragm together, said valve being of larger diameter than the opening through said valve seat, forcing the valve while assembled with said diaphragm through the opening in said valve seat and positioning the periphery of the diaphragm on the bottom section, placing the top section on the periphery of the diaphragm and forcing it against the bottom section, placing a metal clamping ring around the joint between the top and bottom sections, and turning over at least one end of the clamping ring against a radial shoulder on one of the sections to firmly secure the sections together.

12. In an outlet pressure regulator for gas appliance or gas pilot flows, a housing comprising top and bottom sections with cooperating recesses defining a diaphragm cavity, a diaphragm in said cavity sealing off the bottom section from the top section, an outlet passage in said bottom section opening under said diaphragm, an inlet passage in said bottom section, a valve seat aperture in said bottom section connecting said inlet passage with the bottom of said diaphragm, an expandable rubber valve seat in said valve seat aperture, a valve attached to said diaphragm and cooperating with the bottom of said rubber valve seat to control pressure drop between the inlet passage and the diaphragm cavity, said valve being slightly larger in diameter than the opening through said valve seat, the lower portion of said valve seat which engages said valve is inserted in a portion of said valve seat aperture that is no smaller in diameter than the outside diameter of said valve seat portion whereby said seat portion is unstressed radially at assembly and pressure in said inlet passage can get between the wall of said aperture and the circumference of said valve seat portion and tend to reduce the inner diameter of said seat portion.

13. The method of manufacturing a gas appliance outlet pressure regulator, which regulator comprises top and bottom housing sections having recesses which together define a diaphragm cavity, a diaphragm and a valve, the steps comprising forming at the same operation diaphragm locating surfaces and a valve seat receiving aperture in said bottom section, inserting a rubber valve seat in said valve seat aperture in said bottom section, inserting the valve with the diaphragm attached thereto through said valve seat causing expansion thereof to permit passage of the valve, rigidly connecting the top and bottom halves with the outer circumferential edge of the diaphragm between them while locating the top and bottom halves by means of a locating tool inserted in the spring stack of the top half and pressing the diaphragm against said diaphragm locating surfaces.

14. In a low pressure gas valve, a housing having a valve seat aperture therein, said aperture having a first portion of one diameter and a second portion of a larger diameter, a flanged rubber valve seated in said aperture having a first body portion and a second flange portion located respectively in said first and second seat portions, and in the free state of said rubber being no larger in diameter than the corresponding first and second valve seat aperture portions, and means in the housing compressing only said second flange portion and radially expanding it against the wall of said second seat portion, in the assembled state only the second flange portion of said rubber seat being expanded diametrically, said first body portion comprising the inlet side of the valve seat.

15. In a low pressure gas pilot and appliance type regulator, the combination of a body having a bottom section and a top section secured to the bottom section, recesses formed in the confronting faces of said top and bottom sections and cooperating to provide a diaphragm cavity, a valve seat receiving aperture formed in the bottom section and opening into said cavity and having an upwardly presenting shoulder, an inlet aperture formed in said bottom section and opening into said aperture, a rubber valve seat member mounted in said valve seating aperture and having a flange seated on said shoulder, means secured to said bottom section and holding said rubber member seated on said shoulder, said member having a through opening connecting said inlet with said cavity, and a diaphragm and valve assembly mounted in said cavity including a valve body member of greater diameter than said opening located on the side of said valve seat remote from said cavity, said valve seat member being deformable to permit passage of the valve body therethrough, one of said members being tapered to facilitate passage of the valve body member through the opening, the bottom of said rubber member fitting snugly in a portion of said valve seat receiving aperture and the joint between the wall of said aperture and said rubber member opening into the inlet aperture whereby excessive pressure in the inlet aperture can get behind the rubber member and act to reduce the diameter of said opening.

16. The invention set forth in claim 15 wherein the wall of said valve seat receiving aperture extends a substantial distance down into the inlet aperture and including lugs in said bottom section and a flat on the top of the wall of the inlet aperture all engaging the bottom of the diaphragm assembly and supporting the valve member at the correct height for assembly of the diaphragm between the top and bottom sections, said bottom section having an outlet passage therein communicating with said rubber member opening, the minimum cross sections of said inlet aperture, said outlet passage, and said member opening all being of substantially the same area.

References Cited in the file of this patent

UNITED STATES PATENTS

| | | |
|---|---|---|
| Re. 4,396 | Holly | May 23, 1871 |
| 94,748 | Holly | Sept. 14, 1869 |
| 198,353 | Chollar | Dec. 18, 1877 |
| 218,325 | Shannon | Aug. 5, 1879 |
| 731,255 | Wilson | June 16, 1903 |
| 966,513 | Avery | Aug. 9, 1910 |
| 1,043,412 | Faunce | Nov. 5, 1912 |
| 1,518,775 | Cordley | Dec. 9, 1924 |
| 2,094,264 | Crowley | Sept. 28, 1937 |
| 2,223,509 | Brauer | Dec. 3, 1940 |
| 2,447,067 | Hamilton | Aug. 17, 1948 |
| 2,660,834 | McGlashan | Dec. 1, 1953 |
| 2,662,348 | Jacobsson | Dec. 15, 1953 |
| 2,715,416 | McKinley | Aug. 16, 1955 |